US011844043B2

(12) United States Patent
Livoti et al.

(10) Patent No.: US 11,844,043 B2
(45) Date of Patent: Dec. 12, 2023

(54) NEAR REAL TIME OUT OF HOME AUDIENCE MEASUREMENT

(71) Applicant: The Nielsen Company (US), LLC, New York, NY (US)

(72) Inventors: John T. Livoti, Clearwater, FL (US); Stanley Wellington Woodruff, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 45 days.

(21) Appl. No.: 17/360,670

(22) Filed: Jun. 28, 2021

(65) Prior Publication Data
US 2022/0417888 A1 Dec. 29, 2022

(51) Int. Cl.
G06Q 30/0203 (2023.01)
H04W 64/00 (2009.01)
H04W 4/029 (2018.01)

(52) U.S. Cl.
CPC ...... H04W 64/003 (2013.01); G06Q 30/0203 (2013.01); H04W 4/029 (2018.02); H04W 64/006 (2013.01)

(58) Field of Classification Search
None
See application file for complete search history.

(56) References Cited

U.S. PATENT DOCUMENTS

| 2011/0066437 | A1* | 3/2011 | Luff | G06Q 30/02 704/254 |
| 2013/0343192 | A1* | 12/2013 | Kotecha | H04L 1/18 370/235 |
| 2015/0172387 | A1* | 6/2015 | Ge | H04W 48/16 370/254 |
| 2015/0215715 | A1* | 7/2015 | Sheen | H04R 27/00 381/77 |
| 2017/0302982 | A1* | 10/2017 | Simpson | H04N 21/2407 |
| 2018/0176618 | A1* | 6/2018 | Yang | H04N 21/2389 |
| 2018/0192119 | A1* | 7/2018 | Stigall | G06T 7/00 |

* cited by examiner

Primary Examiner — German Viana Di Prisco

(57) ABSTRACT

Methods, apparatus, systems and articles of manufacture for near real time out of home audience measurement are disclosed. An example apparatus includes at least one memory; instructions; and processor circuitry to execute the instructions to at least: receive a first data transmission request at a first portable meter; send a second data transmission request from the first portable meter to a second portable meter; determine whether the first portable meter is capable of transmitting at least one data packet, based at least in part on an indication the second portable meter is capable of transmitting the at least one data packet; and in response to determining the first portable meter is capable of transmitting the at least one data packet, transmit the at least one data packet.

20 Claims, 13 Drawing Sheets

NEAR REAL TIME OUT OF HOME AUDIENCE MEASUREMENT

FIELD OF THE DISCLOSURE

This disclosure relates generally to media monitoring, and, more particularly, to measurement of media consumption out of the home using cellular phones and mesh networking.

BACKGROUND

Audience measurement entities traditionally determine audience engagement levels for media programming and/or advertisements based on registered panel members. That is, an audience measurement entity enrolls into a panel people who consent to being monitored. The audience measurement entity then monitors those panel members, or panelists, to collect media measurement data identifying media (e.g., television programs, radio programs, movies, streaming video, etc.) presented to those panel members. In this manner, the audience measurement entity can determine exposure measures for different media (e.g., content and/or advertisements) based on the collected media measurement data.

The audience measurement entity typically owns and/or operates a ratings entity subsystem. The media usage and exposure habits of the panelists, as well as demographic data about the audience members, are collected and used to statistically determine the size and demographics of the general audience.

To identify specific media content, techniques such as audio watermarking and/or fingerprinting are commonly used. Audio watermarking identifies media by embedding one or more audio codes (e.g., one or more watermarks), such as media identifying information and/or an identifier that may be mapped to media identifying information, into an audio and/or video component. To identify watermarked media, the watermark(s) are extracted and used to access a table of reference watermarks that are mapped to media identifying information. Unlike watermarking, fingerprint or signature-based media monitoring techniques generally use one or more inherent characteristics of the monitored media during a monitoring time interval to generate a substantially unique proxy for the media.

Watermarked and/or fingerprintable media content is accessible to panelists on a variety of platforms. For example, media content can be viewed on mobile devices, via the Internet, on television sets, etc. These varied platforms allow audiences to engage with media beyond the traditional in-home environment.

Figure 1:
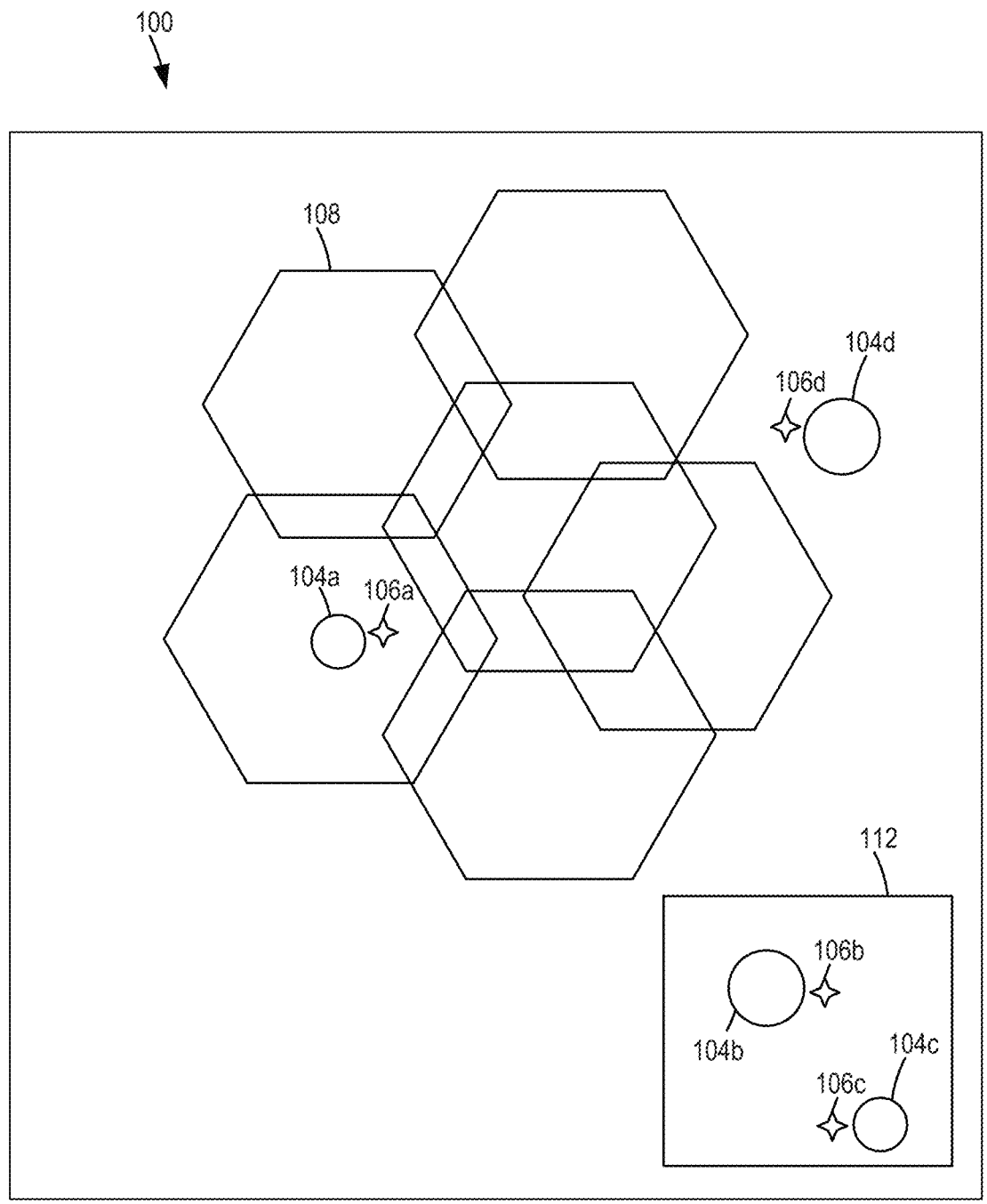
FIG. 1 is an illustration of an example operating environment for using cellular phones and mesh networking for near real time out of home audience measurement.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein "near real time" refers to occurrence in a near instantaneous manner recognizing there may be real world delays for computing time, transmission, etc. Thus, unless otherwise specified, "near real time" refers to real time+/−1 second.

DETAILED DESCRIPTION

Audience measurement entities (AMEs) perform measurements to determine the size and composition of audiences viewing media content. Such information allows, for example, AMEs to report advertising delivery statistics to advertisers.

In the traditional media environment, where most media was broadcast by major networks via cable, antenna, or satellite technologies, media consumption was often confined to the home. However, in recent years, due to the rapid proliferation of media platforms and devices, people are now consuming media in a far greater variety of locations. For example, audience members may view shows, movies, performances and/or other media via smart phones, tablets, watches, and numerous other devices while outside the home.

AMEs use a variety of devices to capture audience measurement information. In some examples, media monitoring functionality may be integrated into a user's home entertainment system. In other instances, media monitoring may be facilitated by stand-alone, portable meter devices carried by a panelist. To support these devices, AMEs provide centralized processing, data storage, data analysis, and other services through an example back office. As described herein, the back office describes a set of functionalities an AME may perform, and does not necessarily refer to any one physical location. Accordingly, an AME's back office may be implemented in hardware, software, or any other suitable medium.

Some meter devices may lack long range communication hardware to communicate directly with the back office. In such examples, data must be relayed through an intermediate device. The intermediate device may be, for example, an in-home docking station with physical and/or wireless connection capabilities. It follows that, if the meter device is out of range of the docking hardware (e.g., out of home), audience measurement information cannot be returned to the back office without a substantial delay.

As a panelist moves throughout their day, they may move in and out of range of these docking stations. For example, a panelist may watch the morning news at home and then listen to the radio while driving to work. Accordingly, when the panelist is not within range of the docking station, previous methods do not allow the meter device to communicate to the back office until returning home. This does not allow for near real time audience measurement. Examples disclosed herein describe a method of using cellular phones and mesh networking to facilitate near real time, out of home audience measurement.

Turning to the figures, FIG. 1 illustrates an example measurement system 100 for using cellular phones and mesh networking for near real time out of home audience measurement. The measurement system 100 includes example users 104a-d, example meter devices 106a-d, an example mesh network 108, and an example home 112.

The example users 104a-d are individuals who access media on one or more user devices. This access and/or exposure to media creates a media impression, which is relayed to the back office. In this example, the users 104a-d have registered as panelists with the AME. In other examples, users are not panelists and have not registered with the AME.

In the illustrated example, users 104a-d are all members of the home 112. Each user 104a-d carries and/or interacts with at least one of the meter devices 106a-d that measures, collects, stores and/or communicates information about media exposure. The example meter devices 106a-d may capture both media exposure information and other relevant data such as a timestamp, duration of access, location/IP address of access, etc.

In some examples, the meter devices 106a-d may be implemented as software and installed on media devices (e.g., smartphones, televisions, gaming consoles, tablets, etc.) to enable tracking of media exposure. In some examples, the meter devices 106a-d associated with users 104a-d are standalone devices placed near media sources. In other examples, the meter devices 106a-d associated with users 104a-d are coupled to media devices to obtain information about media displayed on these devices.

In this example, the meter device 106a associated with user 104a is a portable meter device, capable of collecting information about media to which the user 104a is exposed. User 104a may also carry a cellular phone which is connected (e.g., wirelessly tethered) to the meter device 106a. In some examples, this connection is used to relay a request for media impressions, meter device settings, and/or other data to the back office of the AME.

The user 104a is outside the home 112. Therefore, a direct connection between the meter device 106a and the docking station (within home 112) is not available. Additionally, the user 104a is not in range of a cellular network. In this scenario, the user 104a is unable to provide media impressions to the back office without a secondary connection. In this example, the mesh network 108 serves as this additional connection, allowing communication between the meter device 106a and the back office.

To facilitate near real time measurement of the media usage of user 104a, the user 104a connects the meter device 106a to the example mesh network 108. The example mesh network 108 is a peer to peer network in which many separate meter devices connect and communicate with each other. The example mesh network 108 dynamically relays information from any individual meter device to a back office of the AME. The mesh network 108 also allows information from the back office to be sent directly to any individual meter device which is a part of mesh network 108.

In this example, the mesh network 108 is composed of a series of meter devices wirelessly connected to each other. However, the mesh network 108 can instead be a heterogenous network consisting of hot-spots, meter devices, Wi-Fi-connections, docking stations, etc. The network topology of mesh network 108 and its relation to the back office will be further described in relation to FIGS. 2-7.

User 104b and user 104c interact with meter devices 106b and 106c within the home 112. As the users 104b and 104c are in the home 112, they can use a docking station or a wireless beacon for a wearable device to communicate directly to the back office without having to connect to an out of home cellular and/or mesh network.

In this example, user 104b carries the portable meter device 106b as she moves about the home 112. However, users are not required to carry portable meter devices to provide impression data. For instance, the user 104c may enter identifying information into a remote controller or other input device when consuming media. In this way, the user 104c could provide media usage information without needing an assigned personal meter device.

The example fourth user 104d is outside of the mesh network 108, and therefore must rely on a cellular connection to transmit media impressions from the meter device 106d to the back office. Using a cellular connection to transmit media impression data is often more costly and less energy efficient than using a mesh network, such as the example mesh network 108. For this and other reasons (e.g., privacy concerns, communication latency, etc.) it is often advantageous for the user 104d to send media impression data over the mesh network 108 when it is available.

In the illustrated example of FIG. 1, the user 104d is outside the mesh network 108. Therefore, transmission of media impression data from the meter device 106d over the mesh network 108 is not possible. As described above, transmission of media impression data over the cellular network can be associated with undesirable characteristics. An AME may balance these undesirable characteristics against the benefit of receiving more frequent impression data.

For example, an AME may balance these factors by determining a frequency with which the users 104a-104d send impression data to the back office. In the example of FIG. 1, an impression request interval can be adjusted, for example, by sending specific device settings to a cellular phone that is tethered to a user's meter device. The setting information is then relayed to the meter device for implementation. In some examples, a back office of the AME can vary a data request interval depending on the user's previous or predicted exposure to media sources. Accordingly, in cases where a user is very likely to be exposed to a large amount of tagged media, the AME may request data relatively more frequently than when a user is expected to be exposed to relatively less media. For example, a user at a restaurant watching sports could have a relatively shorter interval between data requests than a user at a remote wilderness location.

Figure 2:
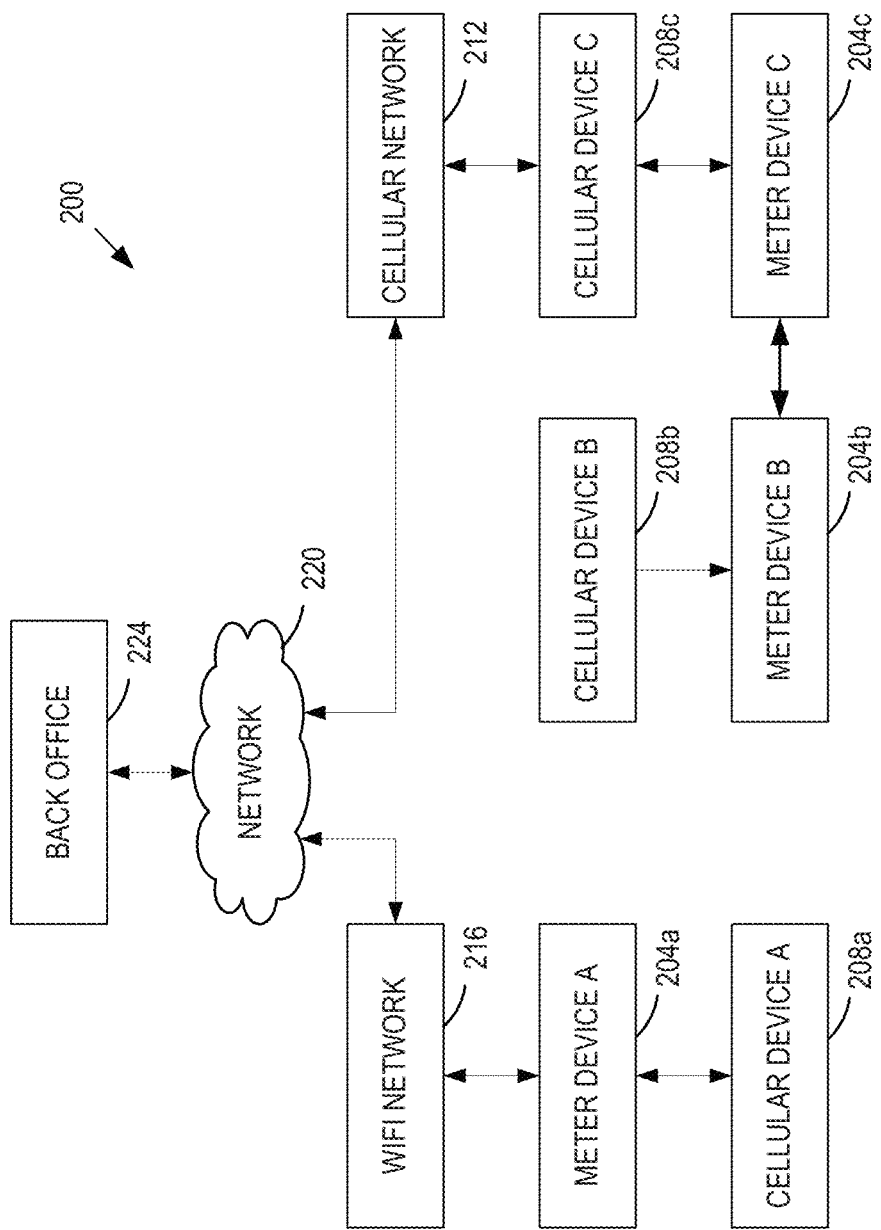
FIG. 2 is a block diagram of an example implementation of an audience measurement system in accordance with FIG. 1.

FIG. 2 is a block diagram of an example implementation of an audience measurement system 200 in accordance with FIG. 1. The audience measurement system 200 includes example meter devices 204a-204c, example cellular devices 208a-208c, an example cellular network 212, an example Wi-Fi network 216, an example network 220, and an example back office 224.

The example back office 224 may be operated by an AME. The back office 224 can store media impression data, analyze media impression data, communicate information, etc. The capabilities of the back office will be further described in relation to FIG. 4.

The example network 220 communicatively couples the Wi-Fi network 216 and cellular network 212 to the back office 224. In this example, the network 220 transmits data from the back office 224 to the cellular network 212 or Wi-Fi network 216. This could, for example, include a wake-up call to a cellular device such as the cellular device 208c. The example network 220 is the Internet. However, the network 220 may be any wide area network (WAN), local area network (LAN), or any combination of wired and/or wireless communication technologies.

The Wi-Fi network 216 is communicatively coupled to the meter device 204a. The example meter device 204a is connected directly to the Wi-Fi network 216, and therefore does not need the cellular device 208a to communicate with the example back office 224.

The cellular device 208a is communicatively coupled to the meter device 204a. In this way, if the user carrying the meter device 204a were to leave the Wi-Fi network 216, the cellular device 208a could attempt to reestablish a connection to the back office 224 via an available cellular network. In example 200, each meter device is communicatively coupled to a cellular device. However, in some examples, the cellular device may include meter functionality via a smartphone application, combining the functionality of a cellular phone and a meter device.

The cellular network 212 is used by the cellular device 208c to connect to the network 220. In example 200, the meter device 204c is not in range of a Wi-Fi network (e.g., an in-home Wi-Fi docking station). Therefore, the cellular device 208c must use a cellular connection to transmit impression data from the meter device 204c.

The meter device 204c is additionally communicatively coupled to the meter device 204b. In example 200, the cellular device 208d and the meter device 204b are unable to communicate with either the Wi-Fi network 216 or the cellular network 212. Therefore, to transmit impression data from the meter device 204b, the meter device 204b and the meter device 204c connect to each other directly. This example peer-to-peer connection creates a mesh network. Such a mesh network could, for example, be a part of the mesh network 108 of FIG. 1.

Figure 3:
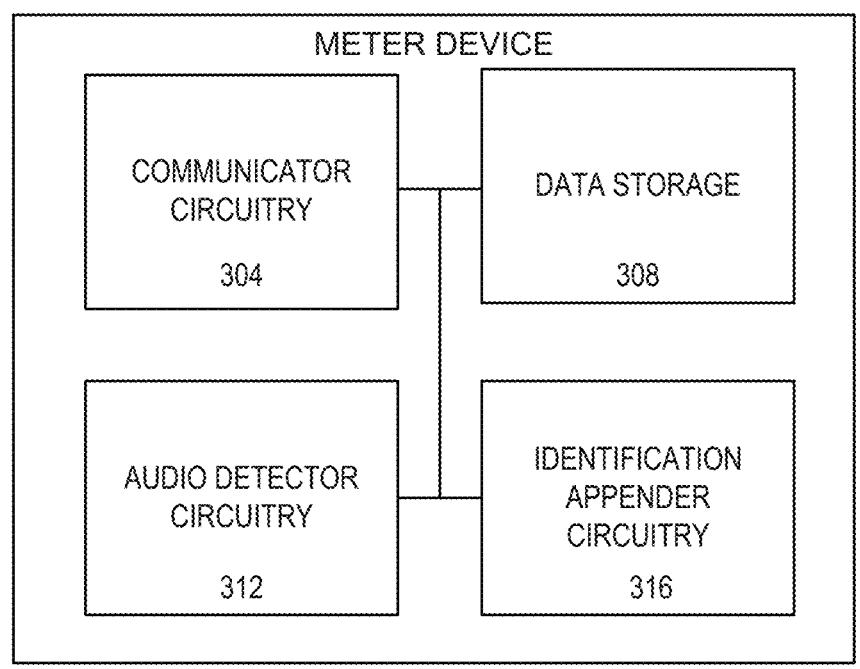
FIG. 3 is block diagram of an example meter device in accordance with the meter devices of FIG. 2.

FIG. 3 is block diagram of an example meter device in accordance with the meter devices of FIG. 2. The example meter device 204 contains example communicator circuitry 304, an example data storage 308, example audio detector circuitry 312, and example identification appender circuitry 316.

In operation, the example communicator circuitry 304 allows for both reception and transmission of data. The example communicator circuitry 304 transmits information wirelessly via radio frequency (RF) signals. In other examples, the communicator may operate using any wired or wireless communication technology. For example, some meter devices may only operate when physically connected to a docking station.

The communicator circuitry 304 receives and transmits data. The communicator circuitry 304 may also determine if the example meter device 204 is capable of transmitting data. The determination can be based upon an indication that a second portable meter is capable of transmitting the data, as in examples where the meter device 204 is part of a mesh network. In other examples, the meter device 204 is only tethered to a user's cellular phone. In such an example, the determination would be based upon whether the cellular phone is connected to a network. This determination may also be based on an indication the meter device 204 is connected to a network or a network-connected device. Furthermore, the data described herein may contain any reportable information, whether real events, status events, heartbeat events, or an empty file.

In some examples, the meter device 204 is part of a mesh network and acts as an intermediary for a second meter device. In such an example, the meter device 204 may receive a transmission from the second meter device requesting information about the meter device 204's connectivity. The meter device 204 may then send a reply transmission indicating whether or not it can transmit data to the back office 224. In some examples, when the meter device 204 receives such a request, the meter device 204 may have a connection to a third portable meter, but lack information to confirm the third portable meter can communicate to the back office 224. In this case, meter device 204 may forward the transmission request to the third portable meter.

The meter device 204 also includes the data storage 308. The data storage 308 can store any data necessary for the functionality of the back office 224. For example, the data storage 308 may contain media impression data before it has been transmitted. The data storage 308 may also include other information, such as device settings provided from the back office 224, user identification data, location data, etc.

To detect watermarked and/or other types of media from the environment, the meter device 204 includes the audio detector circuitry 312. In some meter devices, the audio detector circuitry 312 may function continuously. In other meter devices, the audio detector circuitry 312 may only function when the user goes to a specific location. In some examples, the audio detector circuitry 312 may only operate on intervals specified by the back office 224.

The example identification appender circuitry 316 appends identifying information to watermarked audio data. This information may include a specific identifier assigned to an individual user/panelist or an identifier specific to a meter device such as meter device 204. In some examples, software on a cellular phone functions as a meter device. In such an example, a unique phone identifier may be appended to the watermarked data by the identification appender circuitry 316.

Identification information may further include the location audio was recorded, the time audio was recorded, a proximity to other meters, or any additional data provided by the user. For example, a meter device tethered to a phone may ask a user a number of questions (e.g., how many other people were exposed to the media) and append this information to a media impression request. By appending this identifying information to an audio signature, the back office 224 can more effectively analyze impression data.

While an example manner of implementing the meter device 204 of FIG. 2 is illustrated in FIG. 3, one or more of the elements, processes, and/or devices illustrated in FIG. 3 may be combined, divided, re-arranged, omitted, eliminated, and/or implemented in any other way. Further, the example communicator circuitry 304, the example data storage 308, the example audio detector circuitry 312, the example identification appender circuitry 316 and/or, more generally, the example meter device 204 of FIG. 3 may be implemented by hardware, software, firmware, and/or any combination of hardware, software, and/or firmware. Thus, for example, any of the example communicator circuitry 304, the example data storage 308, the example audio detector circuitry 312, the example identification appender circuitry 316 and/or, more generally, the example meter device 204, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example communicator circuitry 304, the example data storage 308, the example audio detector circuitry 312, and/or the example identification appender circuitry 316 is/are hereby expressly defined to include a non-transitory computer readable storage device or storage disk such as a memory, a digital versatile disk (DVD), a compact disk (CD), a Blu-ray disk, etc., including the software and/or firmware. Further still, the example meter device 204 FIG. 3 may include one or more elements, processes, and/or devices in addition to, or instead of, those illustrated in FIG. 3, and/or may include more than one of any or all of the illustrated elements, processes and devices.

Figure 4:
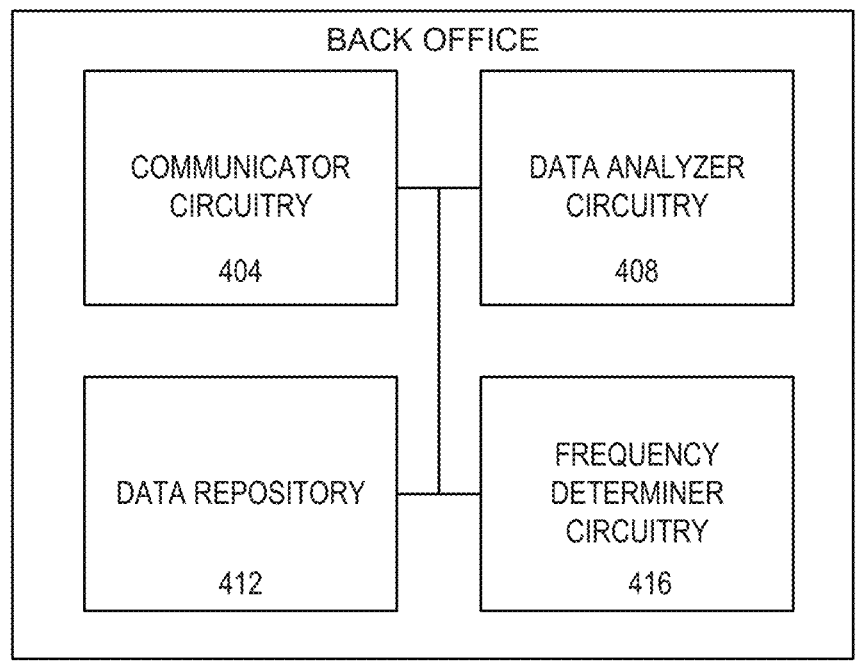
FIG. 4 is a block diagram of an example back office in accordance with the back office of FIG. 2.

FIG. 4 is a block diagram of an example back office 224 in accordance with the back office 224 of FIG. 2. The example back office 224 includes communicator circuitry 404, data analyzer circuitry 408, a data repository 412, and frequency determiner circuitry 416. In this example, the back office 224 is implemented in software running on a server owned by an AME. In some examples, the back office 224 runs on a cloud server or is distributed across multiple servers. In other examples, specific functionalities of the back office may be performed in the cloud.

To communicate with meter devices, the back office 224 includes the communicator circuitry 404. The example communicator circuitry 404 transmits information including data submission frequency, a wake-up broadcast, settings necessary for management of meter devices, etc. The communicator circuitry 404 also receives data from the meter devices associated with the AME, such as the example meter device 204. Receiving data can cause the back office 224 to analyze the data with the data analyzer circuitry 408 or store the data in the data repository 412. The communicator circuitry 404 is not limited to receiving data only from a meter device, the communicator may also receive data from any suitable transmission device.

The example data repository 412 stores data associated with the collection of media impressions. This data could include raw data delivered from a meter device, such as the meter device 204. Data stored in the data repository 412 could further include the results of analysis from the data analyzer circuitry 408, identification information, etc.

The example data analyzer circuitry 408 accesses media impression data and interprets the media impression data delivered by, for example, the meter device 204. To facilitate these tasks, the data analyzer circuitry 408 can access media measurement data. Data may be transmitted to the data analyzer circuitry 408 or accessed directly from the communicator circuitry 404. Data may also be transmitted from the data repository 412 or accessed directly by the data analyzer circuitry 408. The data analyzer can, in combination with the frequency determiner circuitry 416 and the communicator circuitry 304, update the settings of the example meter device 204. The data analyzer can also analyze media measurement data to determine a data path taken to arrive at the back office 224. The data path taken may include WiFi networks, cellular networks, mesh networks, etc.

The example frequency determiner circuitry 416 selects the interval that the meter device 204 is to submit data to the back office 224. The interval may be based upon a rate of prior media exposure. As described in association with FIG. 1, some meter devices may be in areas with relatively higher or lower levels of media exposure. In some examples, when a meter device is in an area associated with frequent media exposure, the meter device is directed to send media impression data more frequently. In other examples, such as when a meter device is in an area associated with infrequent media exposure, the meter device is directed to send media impression data less frequently. By adjusting data transmission frequency, the back office 224 can improve efficiency of a meter device by ensuring data is not sent more frequently than necessary.

While an example manner of implementing the back office 224 of FIG. 2 is illustrated in FIG. 4, one or more of the elements, processes, and/or devices illustrated in FIG. 4 may be combined, divided, re-arranged, omitted, eliminated, and/or implemented in any other way. Further, the example communicator circuitry 404, the example data analyzer circuitry 408, the example data repository 412, the example frequency determiner circuitry 416 and/or, more generally, the example back office 224 of FIG. 4 may be implemented by hardware, software, firmware, and/or any combination of hardware, software, and/or firmware. Thus, for example, any of the example communicator circuitry 404, the example data analyzer circuitry 408, the example data repository 412, the example frequency determiner circuitry 416 and/or, more generally, the example back office 224 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example communicator circuitry 404, the example data analyzer circuitry 408, the example data repository 412, and/or the example frequency determiner circuitry 416 is/are hereby expressly defined to include a non-transitory computer readable storage device or storage disk such as a memory, a digital versatile disk (DVD), a compact disk (CD), a Blu-ray disk, etc., including the software and/or firmware. Further still, the example back office 224 FIG. 4 may include one or more elements, processes, and/or devices in addition to, or instead of, those illustrated in FIG. 4, and/or may include more than one of any or all of the illustrated elements, processes and devices.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5A:
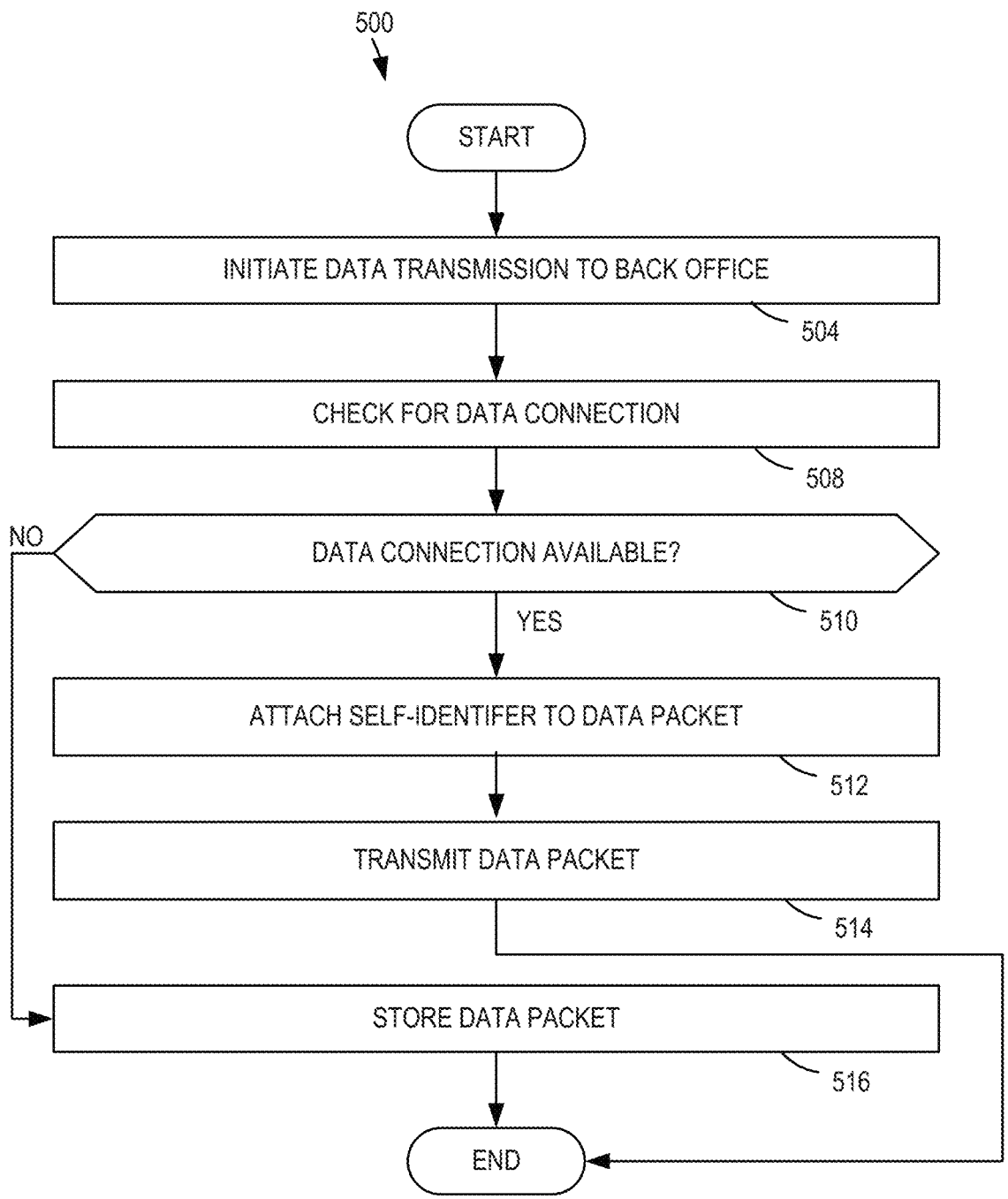
FIGS. 5A, 5B, and 6 are flowcharts representative of example machine readable instructions that may be executed by example processor circuitry to implement the example meter device of FIG. 3.
Figure 5B:
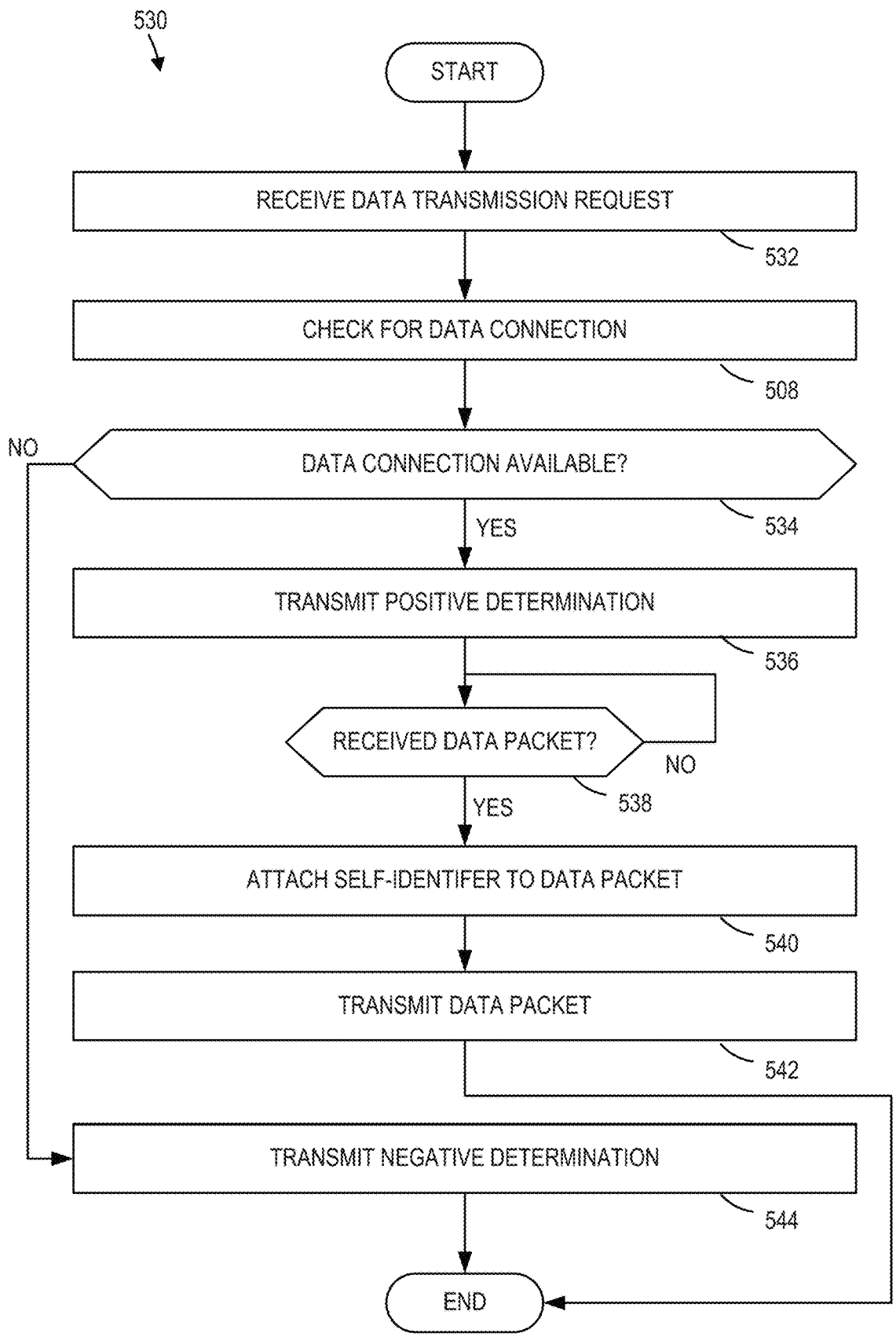
Figure 6:
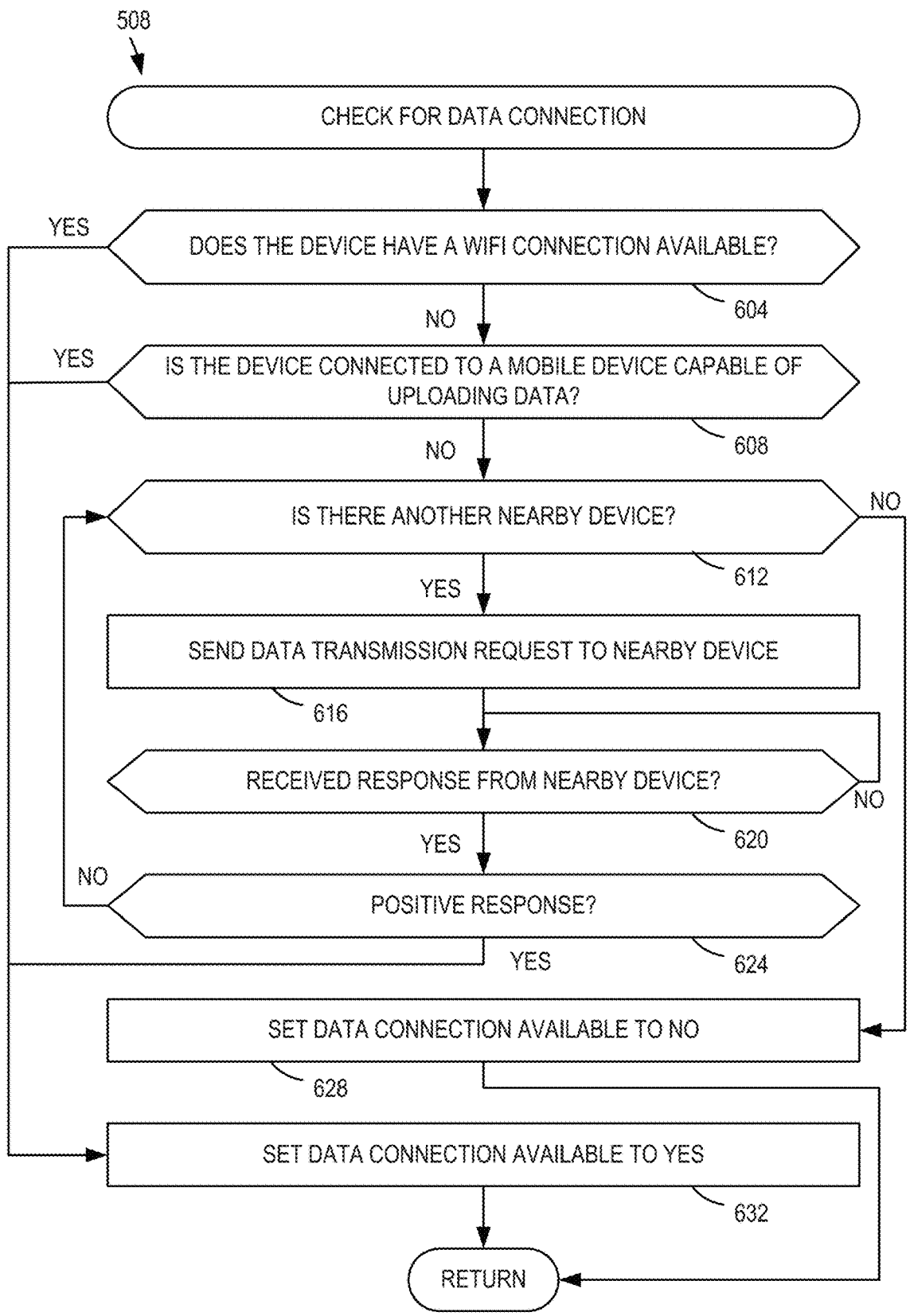

Flowcharts representative of example hardware logic circuitry, machine readable instructions, hardware implemented state machines, and/or any combination thereof for implementing the meter device 204 of FIG. 3 are shown in FIGS. 5A, 5B, and 6. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 5A, 5B, and 6, many other methods of implementing the example meter device 204 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

Specifically, FIG. 5A starts (Block 504) when the example communicator circuitry 304 initiates a data transmission to the back office 224. In response to this data request, the communicator circuitry 304 checks for a data connection (Block 508). Further detail on the operation of block 508 is described below in relation to FIG. 6.

If a data connection is available, the identification appender circuitry 316 attaches a self-identifier to the data packet (Block 512) and transmits the data packet (Block 514) to its destination. If, at block 510, a data connection was not available, the meter device 204 instead stores this data (Block 520) in the data storage 308 for transmission at a later time.

FIG. 5B starts at block 532, where the communicator circuitry 304 receives a data transmission request. This example data transmission request is from a secondary meter device, rather than the back office 224. Next, the meter device 204 the continues to block 508, where the communicator circuitry 304 checks for a data connection. If a data connection is available (Block 534: YES), then a positive determination is transmitted (Block 536), and the meter device 204 checks if it has received a data packet (Block 538). After the packet is received (Block 538: YES), a self-identifier is attached to the data packet (Block 540) and the data packet is transmitted (Block 542). In the case that, at block 534, a data connection is not available (Block 534: NO), a negative determination is transmitted (Block 544).

FIG. 6 shows block 508 of FIGS. 5A and 5B in further detail. To determine connectivity, at block 604, the communicator circuitry 304 determines if a Wi-Fi connection is available for use by the meter device 204. If it is (Block 604:

YES) then a data connection availability is set to yes. Otherwise (Block 604: NO), the communicator circuitry 304 checks for connection to a mobile device (e.g., a cellular phone) capable of uploading data. If a such a device is detected (Block 608: YES), then the data connection availability is set to yes.

If neither a Wi-Fi nor a mobile connection is available (Block 608: NO), then the communicator circuitry 304 checks if there is another (e.g., a second meter) device to connect to (Block 612). If so, a request to this nearby device is sent (Block 616) and the meter device 204 awaits a response from the nearby device (Block 620). In turn, if the response is positive (Block 624) then the connection availability is set to yes (Block 632). Otherwise (Block 624: NO), the entire process is repeated at block 612. If there is no nearby device (Block 612: NO), then the data connection availability is set accordingly.

Figure 7:
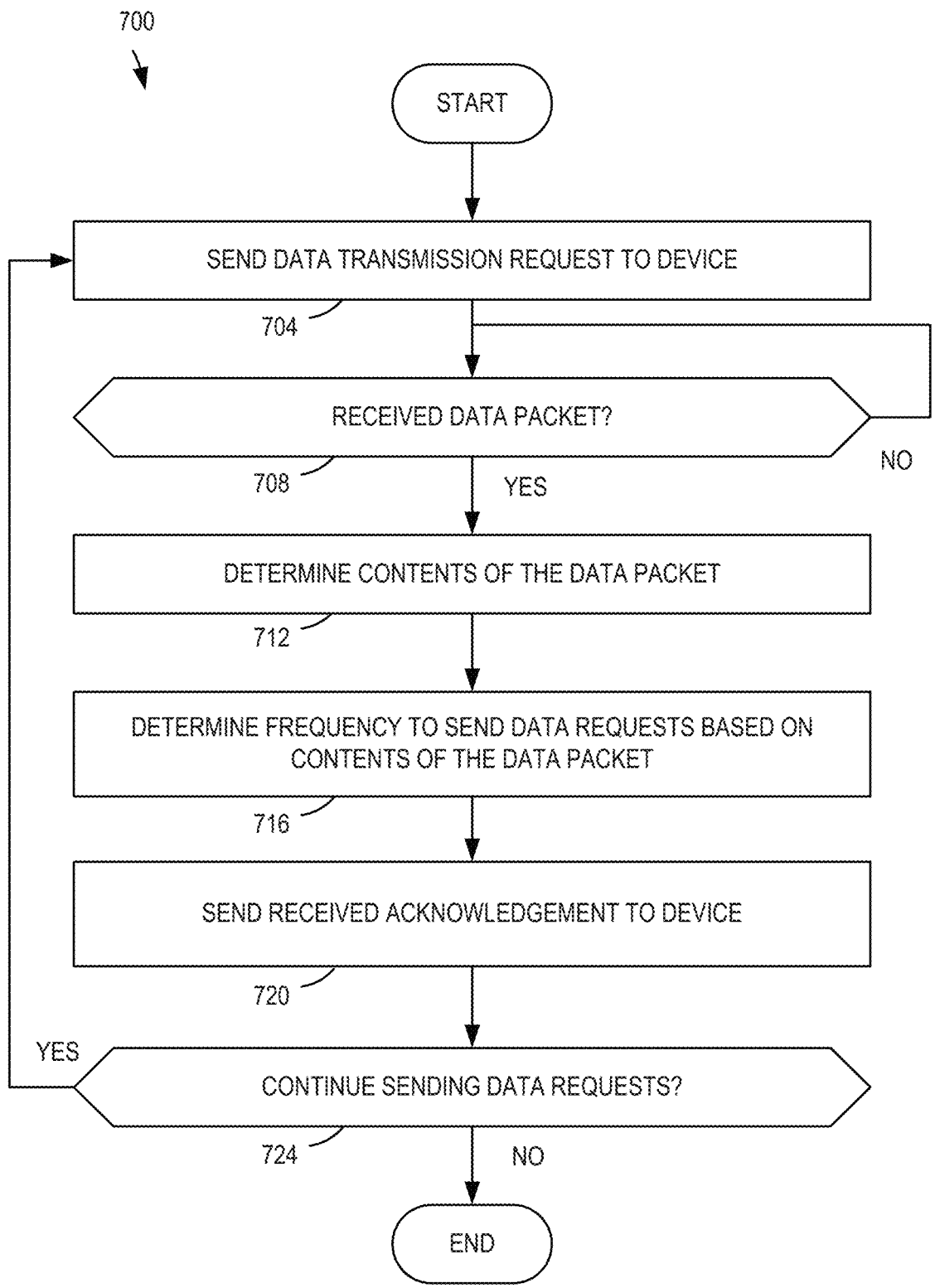
FIG. 7 is a flowchart representative example machine readable instructions that may be executed by example processor circuitry to implement the example back office of FIG. 4.

Flowcharts representative of example hardware logic circuitry, machine readable instructions, hardware implemented state machines, and/or any combination thereof for implementing the back office 224 of FIG. 4 are shown in FIG. 7. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 7, many other methods of implementing the example back office 224 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

In FIG. 7, The communicator circuitry 404 of the example back office 224 sends a data transmission request to a device (Block 704). This device could be, for example, a meter device, a cellular phone, or a wearable. The communicator circuitry 404 then awaits a response from the device (Block 708). After receiving a response (Block 708: YES), the data analyzer circuitry 408 determines the contents of the data packet (Block 712). The frequency determiner circuitry 416 then determines a frequency to send data requests (Block 716) and sends an acknowledgement that the back office 224 has received the data packet (Block 720). In this example, the acknowledgement is sent along the same path as it was received. In some examples, this path is no longer available and the acknowledgement may be sent via another path associated with the device. The process then either repeats (Block 724: YES) or ends (Block 724: NO) depending on if it is time to send another data transmission request.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5A, 5B, 6, and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
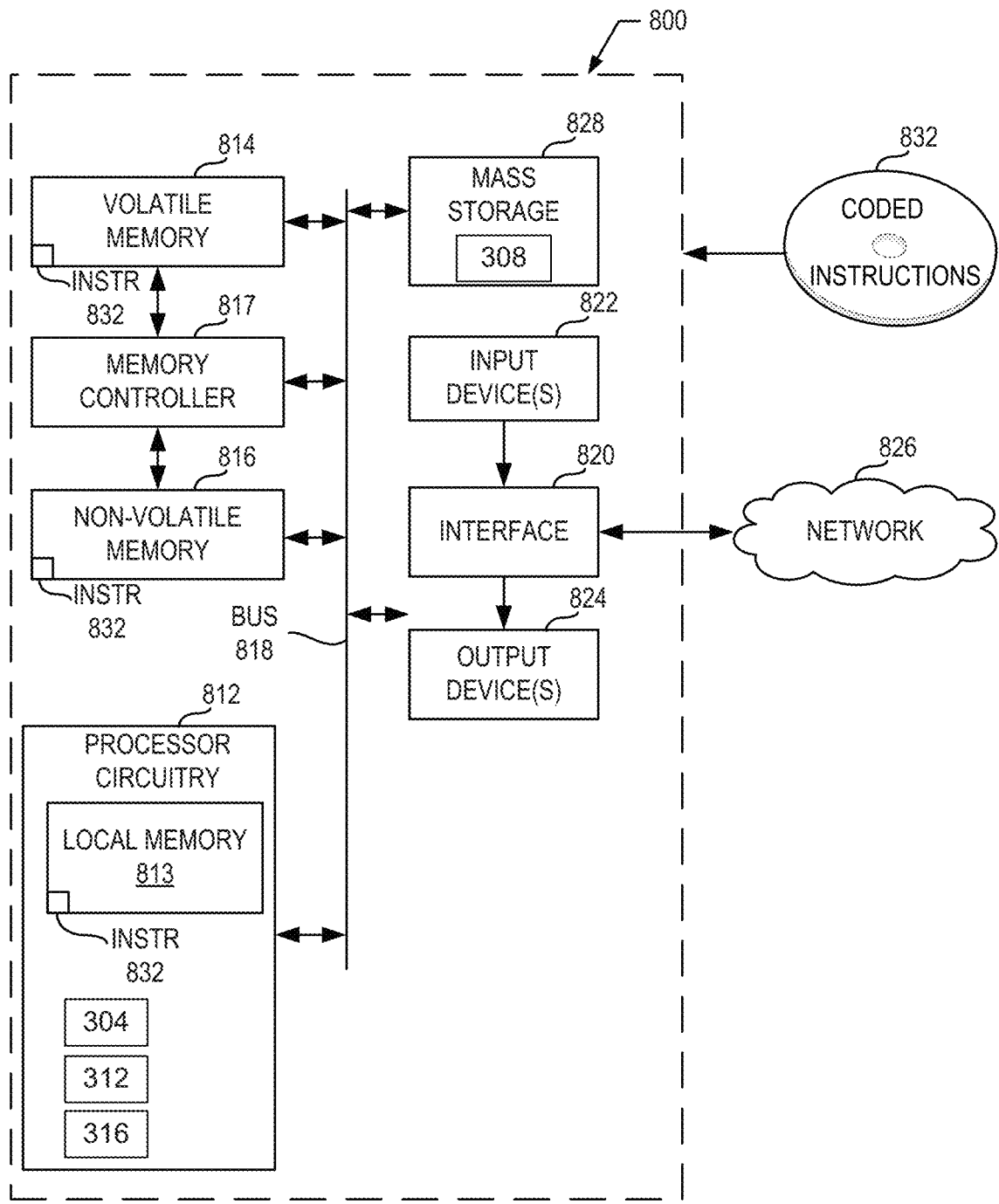
FIG. 8 is a block diagram of an example processing platform including processor circuitry structured to execute the example machine readable instructions of FIGS. 5A, 5B, and 6 to implement the example meter device of FIG. 3.

FIG. 8 is a block diagram of an example processor platform 800 structured to execute and/or instantiate the instructions of FIGS. 5A, 5B, and 6 to implement the example meter device 204 of FIG. 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example communicator circuitry 304, the example data storage 308, the example audio detector circuitry 312, and the example identification appender circuitry 316.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814 and 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIGS. 5A, 5B, and 6, may be stored in the mass storage device 828, in the volatile memory 814, in the non-volatile memory 816, and/or on a removable non-transitory computer readable storage medium such as a CD or DVD.

Figure 9:
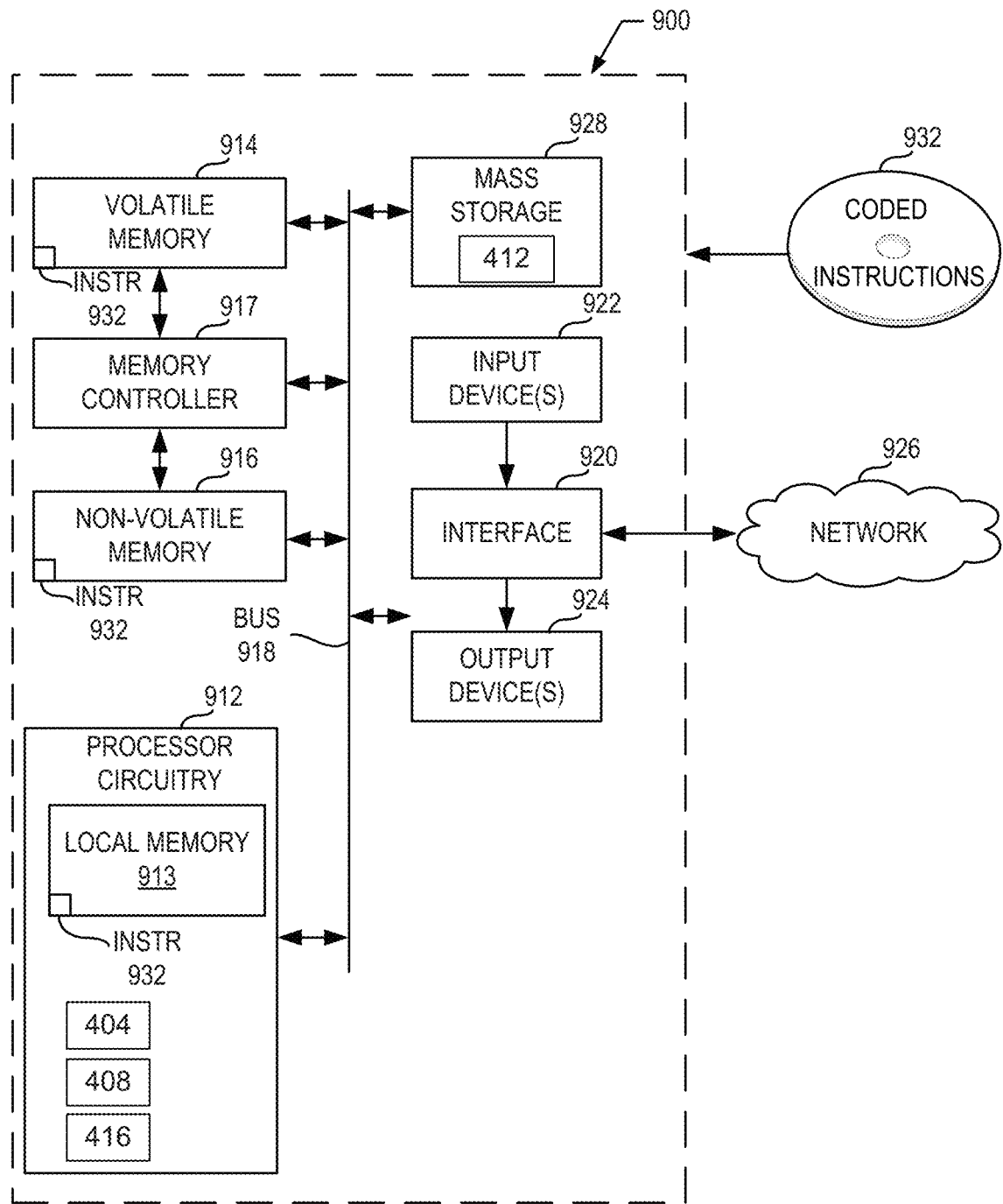
FIG. 9 is a block diagram of an example processing platform including processor circuitry structured to execute the example machine readable instructions of FIG. 7 to implement the example back office of FIG. 4.

FIG. 9 is a block diagram of an example processor platform 900 structured to execute and/or instantiate the instructions of FIG. 7 to implement the example back office 224 of FIG. 4. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example communicator circuitry 404, the example data analyzer circuitry 408, and the example frequency determiner circuitry 416.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIG. 7, may be stored in the mass storage device 928, in the volatile memory 914, in the non-volatile memory 916, and/or on a removable non-transitory computer readable storage medium such as a CD or DVD.

Figure 10:
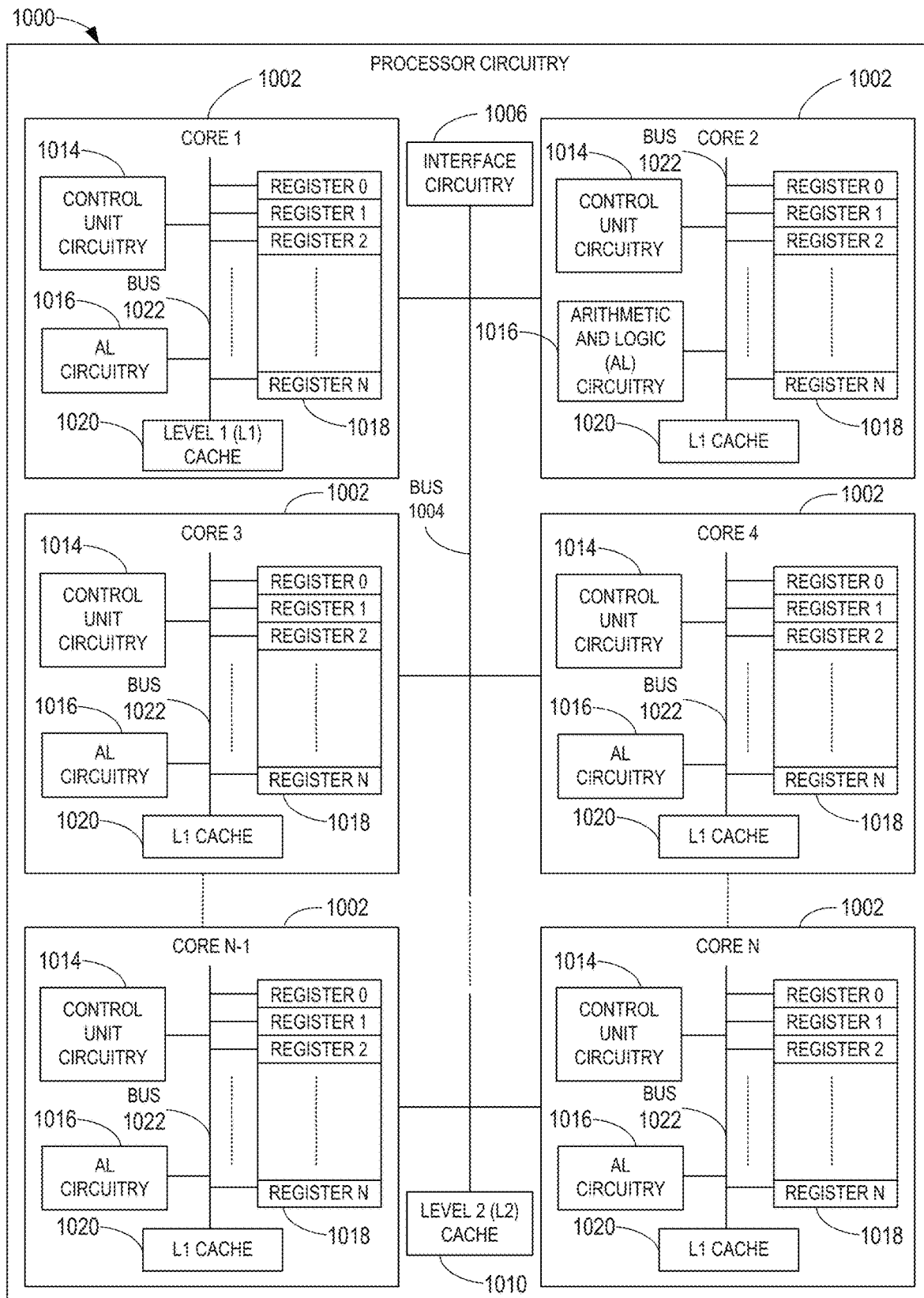
FIG. 10 is a block diagram of an example implementation of the processor circuitry of FIGS. 8-9.

FIG. 10 is a block diagram of an example implementation of the processor circuitry 812 of FIG. 8 and/or 912 of FIG. 9. In this example, the processor circuitry 812 of FIG. 8 and/or 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 5A, 5B, 6, and 7.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 814, 816 of FIG. 8 and 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1020 may implement at least one of an I2C bus, a SPI bus, a PCI bus, or a PCIe bus.

Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
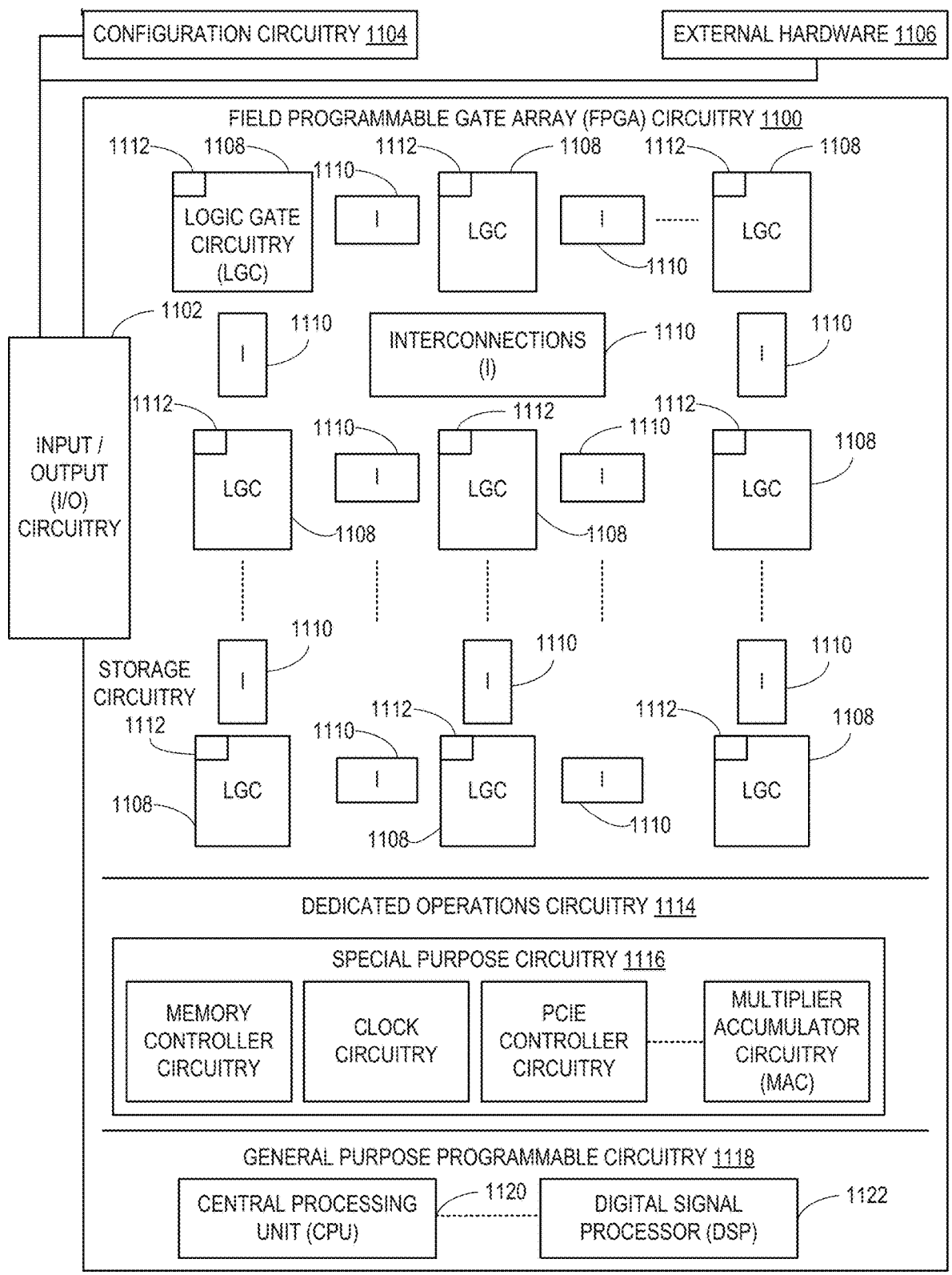
FIG. 11 is a block diagram of another example implementation of the processor circuitry of FIGS. 8-9
Figure 12:
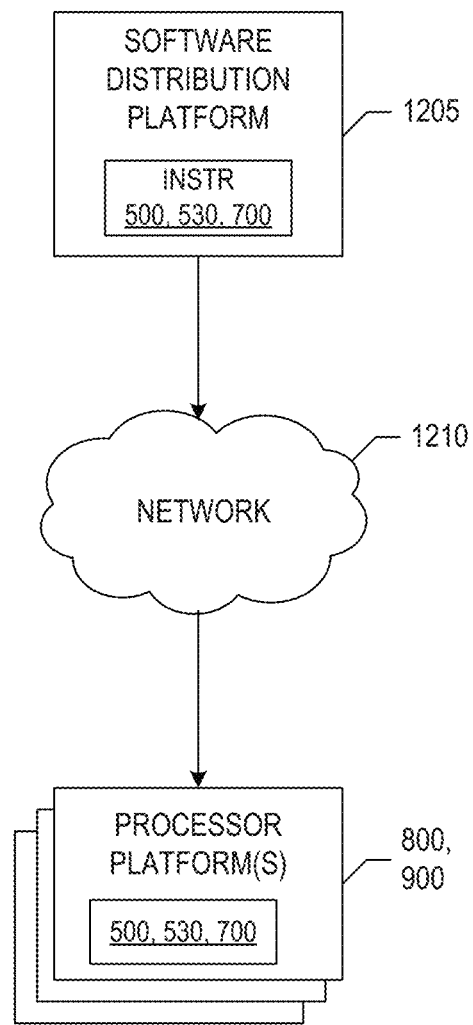
FIG. 12 is a block diagram of an example software distribution platform (e.g., one or more servers) to distribute software (e.g., software corresponding to the example machine readable instructions of FIGS. 5A, 5B, 6, and 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

FIG. 11 is a block diagram of another example implementation of the processor circuitry 812 of FIG. 8 and/or 912 of FIG. 9. In this example, the processor circuitry 812 and/or 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowcharts of FIGS. 5A, 5B, 6, and 7 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 5A, 5B, 6, and 7. In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 5A, 5B, 6, and 7. As such, the FPGA circuitry 1100 may be structured to effectively instantiate some or all of the machine readable instructions of the flowchart of FIGS. 5A, 5B, 6, and 7 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 5A, 5B, 6, and 7 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIGS. 5A, 5B, 6, and 7 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 812 of FIG. 8 and/or 912 of FIG. 9, many other approaches are contemplated. For example, as mentioned above, modern FPGA circuitry may include an on-board CPU, such as one or more of the example CPU 1120 of FIG. 11. Therefore, the processor circuitry 812 of FIG. 8 and/or 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 5A, 5B, 6, and/or 7 may be executed by one or more of the cores 1002 of FIG. 10 and a second portion of the machine readable instructions represented by the flowcharts of FIGS. 5A, 5B, 6, and/or 7 may be executed by the FPGA circuitry 1100 of FIG. 11.

In some examples, the processor circuitry 812 of FIG. 8 and/or 912 of FIG. 9 may be in one or more packages. For example, the processor circuitry 1000 of FIG. 10 and/or the FPGA circuitry 1100 of FIG. 11 may be in one or more packages. In some examples, an XPU may be implemented by the processor circuitry 812 of FIG. 8 and/or 912 of FIG. 9, which may be in one or more packages. For example, the XPU may include a CPU in one package, a DSP in another package, a GPU in yet another package, and an FPGA in still yet another package.

From the foregoing, it will be appreciated that example methods, apparatus and articles of manufacture have been disclosed that enable near real time measurement of media consumption out of the home using cellular phones and mesh networking Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one memory; and
processor circuitry configured to execute instructions stored in the at least one memory, the instructions to at least:
receive a first data transmission request at a first portable meter;
send a second data transmission request from the first portable meter to a second portable meter;
determine whether the first portable meter is capable of transmitting at least one data packet, based at least in part on an indication the second portable meter is capable of transmitting the at least one data packet, wherein to determine whether the first portable meter is capable of transmitting data, the processor circuitry is to execute the instructions to:
determine whether the first portable meter is connected to a network; and
determine whether the first portable meter is connected to a network-connected device, wherein the first portable meter is tethered to a cellular phone; and
in response to determining the first portable meter is capable of transmitting the at least one data packet and wherein the at least one data packet includes watermarked audio data,
detect the watermarked audio data at intervals specified by a back office, the intervals based on a rate of media exposure at the second portable meter; and
transmit the at least one data packet.

2. The apparatus of claim 1, wherein the processor circuitry is to execute the instructions to attach an identification to the at least one data packet.

3. The apparatus of claim 1, wherein in response to determining the first portable meter is not capable of transmitting the at least one data packet, the processor circuitry is to execute the instructions to store the at least one data packet on the first portable meter.

4. The apparatus of claim 1, wherein a reply from the first portable meter is based on whether the first portable meter received the first data transmission request from a third portable meter or a back office.

5. The apparatus of claim 1, wherein the network is a mesh network.

6. The apparatus of claim 1, wherein the network-connected device is the cellular phone.

7. The apparatus of claim 1, wherein the processor circuitry is to execute the instructions to:
detect the watermarked audio data at a location determined by the back office; and
append identifying information to the watermarked audio data.

8. The apparatus of claim 7, wherein the identifying information includes:
an identifier of the tethered cellular phone;
a panelist identifier;
a time and the location the watermarked audio data was detected; and
a count of portable meters proximate to the first portable meter, the count determined based on a response to a user prompt generated by the cellular phone.

9. A non-transitory computer readable medium comprising instructions that, when executed by programmable circuitry, cause a machine to at least:
receive a first data transmission request at a first portable meter;
send a second data transmission request from the first portable meter to a second portable meter;
determine whether the first portable meter is capable of transmitting at least one data packet, based at least in part on an indication the second portable meter is capable of transmitting the at least one data packet, wherein to determine whether the first portable meter is capable of transmitting data, the instructions, when executed, cause the programmable circuitry to:
determine whether the first portable meter is connected to a network; and
determine whether the first portable meter is connected to a network-connected device, wherein the network-connected device is a cellular phone, wherein the first portable meter is tethered to the cellular phone; and
in response to determining the first portable meter is capable of transmitting the at least one data packet and wherein the at least one data packet includes watermarked audio data,
detect the watermarked audio data at intervals specified by a back office, the intervals based on a rate of media exposure at the second portable meter; and
transmit the at least one data packet.

10. The non-transitory computer readable medium of claim 9, wherein the instructions, when executed, cause the first portable meter to attach an identification to the at least one data packet.

11. The non-transitory computer readable medium of claim 9, wherein in response to a determination the first portable meter is not capable of transmitting the at least one data packet, the instructions, when executed, cause the programmable circuitry to store the at least one data packet on the first portable meter.

12. The non-transitory computer readable medium of claim 9, wherein a reply from the first portable meter is based on whether the first portable meter received the first data transmission request from a third portable meter or a back office.

13. The non-transitory computer readable medium of claim 9, wherein the
network is a mesh network.

14. The non-transitory computer readable medium of claim 9, the instructions, when executed, cause the programmable circuitry to:
detect the watermarked audio data at a location determined by the back office; and
append to the watermarked audio data: (1) a cellular phone identifier, (2) a panelist identifier, (3) a time and location the watermarked audio data was detected, and (4) a count of portable meters proximate to the first portable meter, the count determined based on a response to a user prompt generated by the cellular phone.

15. A method comprising:
receiving, by executing an instruction with programmable circuitry, a first data transmission request at a first portable meter;
sending, by executing an instruction with the programmable circuitry, a second data transmission request from the first portable meter to a second portable meter;
determining, by executing an instruction with the programmable circuitry, whether the first portable meter is capable of transmitting at least one data packet, based at least in part on an indication the second portable meter is capable of transmitting the at least one data packet, wherein determining whether the first portable meter is capable of transmitting data further includes:
determining whether the first portable meter is connected to a cellular phone, wherein the first portable meter is tethered to the cellular phone, and wherein the at least one data packet includes watermarked audio data;
detecting the watermarked audio data at intervals specified by a back office, the intervals based on a rate of media exposure at the second portable meter; and
transmitting, by executing an instruction with the programmable circuitry, the at least one data packet.

16. The method of claim 15, further including attaching an identification to the at least one data packet.

17. The method of claim 15, further including storing the at least one data packet on the first portable meter in response to determining the first portable meter is not capable of transmitting the at least one data packet.

18. The method of claim 15, further including replying based on whether the first portable meter received the first data transmission request from a third portable meter or a back office.

19. The method of claim 15, wherein the first portable meter is connected to a mesh network.

20. The method of claim 15, further including:
detecting the watermarked audio data at a location determined by a back office; and
appending to the watermarked audio data: (1) a cellular phone identifier, (2) a panelist identifier, (3) a time and location the watermarked audio was detected, and (4) a count of portable meters proximate to the first portable meter, the count determined based on a response to a user prompt generated by the tethered cellular phone.

* * * * *